United States Patent [19]

Grutsch et al.

[11] Patent Number: 5,205,906
[45] Date of Patent: Apr. 27, 1993

[54] PROCESS FOR THE CATALYTIC TREATMENT OF WASTEWATER

[75] Inventors: James F. Grutsch, Hammond, Ind.; George A. Mortimer, Lake Charles, La.

[73] Assignee: Chemical Waste Management, Inc., Oak Brook, Ill.

[21] Appl. No.: 654,417

[22] Filed: Feb. 11, 1991

Related U.S. Application Data

[63] Continuation of Ser. No. 417,885, Oct. 6, 1989, abandoned, which is a continuation-in-part of Ser. No. 230,241, Aug. 8, 1988, abandoned.

[51] Int. Cl.$^5$ ............................ B01D 1/00; C02F 1/04
[52] U.S. Cl. ............................... 159/47.3; 159/901; 203/14; 203/21; 203/94; 203/98; 203/DIG. 8; 210/762; 210/763; 423/230; 423/245.3; 423/247
[58] Field of Search .............. 159/47.3, 901; 203/21, 203/14, 98, DIG. 6, 94, DIG. 8; 423/245.3, 247, 230; 210/762, 763

[56] References Cited

U.S. PATENT DOCUMENTS

| | | | |
|---|---|---|---|
| 2,905,523 | 9/1959 | Houdry et al. | 423/247 |
| 3,127,243 | 3/1964 | Konikoff | 23/204 |
| 3,254,962 | 6/1966 | Fox et al. | 203/42 |
| 3,487,016 | 12/1969 | Zeff | 210/18 |
| 3,804,756 | 4/1974 | Callahan et al. | 210/59 |
| 3,823,088 | 7/1974 | Box, Jr. et al. | 210/63 |
| 3,926,129 | 12/1975 | Wall | 159/473 |
| 3,933,576 | 1/1976 | Rushton | 159/901 |
| 3,939,807 | 11/1976 | Johnston | 423/437 |
| 3,992,295 | 11/1976 | Box, Jr. et al. | 210/63 |
| 3,997,440 | 12/1976 | Box, Jr. et al. | 210/63 |
| 4,002,525 | 1/1977 | Baierl | 159/473 |
| 4,012,335 | 3/1977 | Woerner | 423/245.3 |
| 4,021,500 | 5/1977 | Rogers | 260/680 |
| 4,062,772 | 12/1977 | Box, Jr. et al. | 210/63 |
| 4,072,608 | 2/1978 | Farha, Jr. et al. | 210/63 |
| 4,082,606 | 4/1978 | Houston et al. | 159/901 |
| 4,110,370 | 8/1978 | Engelbach et al. | 203/42 |
| 4,141,829 | 2/1979 | Thiel et al. | 210/762 |
| 4,268,399 | 5/1981 | Box, Jr. et al. | 210/762 |
| 4,277,453 | 7/1981 | Aiken et al. | 423/247 |
| 4,279,693 | 7/1981 | Kuhnlein et al. | 159/473 |
| 4,294,706 | 10/1981 | Kakihara et al. | 210/762 |
| 4,330,513 | 5/1982 | Hunter et al. | 423/245 |
| 4,418,045 | 11/1983 | Sato et al. | 423/245.3 |
| 4,559,108 | 12/1985 | Ahlberg | 203/26 |
| 4,632,766 | 12/1986 | Firnhaber et al. | 210/752 |
| 4,698,136 | 10/1987 | El-Allawy | 159/473 |
| 4,699,720 | 10/1987 | Harada et al. | 210/762 |

FOREIGN PATENT DOCUMENTS

| | | | |
|---|---|---|---|
| 0448344 | 5/1948 | Canada | 423/247 |
| 2354974 | 1/1978 | France . | |
| 2609013 | 2/1986 | France . | |
| 2068947 | 12/1969 | United Kingdom . | |

OTHER PUBLICATIONS

ASME publication entitled "Development History of the RCC Brine Concentrator for Concentrating Cooling Tower Blow Down", by J. H. Anderson, 1976.

Article entitled, "Destruction of Volatile Organic Compounds Via Catalytic Incineration" authored by B. H. Tichenor and M. A. Palazzol, Environmental Progress, vol. 6, No. 3, Aug. 1987.

Weipsberger et al., "Distillation" vol. IV, 1965 p. 405.

"Catalytic Oxidation of Aqueous Wastes", John Oliver, Aug. 1954, pp. 425–427, Chemical Engineering Progress, vol. 50, No. 8, AICHE, New York, U.S.

"Destructive Catalytic Oxidation of Aqueous Waste Materials", R. V. Green et al., Mar. 1952, pp. 288–299, Sewage and Industrial Wastes, vol. 24, No. 3, Champaign, Ill., U.S.

Primary Examiner—Virginia Manoharan
Attorney, Agent, or Firm—Allegretti & Witcoff, Ltd.

[57] ABSTRACT

A process is presented for the treatment of wastewater containing non-volatile pollutants and volatile chemically oxidizable organic and inorganic pollutants. The process combines efficient evaporation to concentrate the non-volatile compounds and a catalytic oxidation reaction to convert the volatilized organic and inorganic pollutants. A condensate product may be obtained by treating wastewater according to the inventive process that is of distilled water quality and substantially free of minerals and organics.

13 Claims, 2 Drawing Sheets

PROCESS FOR THE CATALYTIC TREATMENT OF WASTEWATER

This application is a continuation of application Ser. No. 417,885, filed Oct. 6, 1989, now abandoned, which is a continuation-in-part of Ser. No. 230,241, filed Aug. 8, 1988, now abandoned, the contents which are incorporated herein by reference.

FIELD OF INVENTION

This invention relates generally to the treatment and cleanup of contaminated wastewater. The treatment of contaminated wastewater has become a national environmental priority, since wastewater is being created by so many sources such as landfills, research, industry, power plants, government and many other chemical, pharmaceutical, biological, plating, and photographic processes.

More specifically this invention involves a novel process that concentrates contaminants and catalytically oxidizes volatile pollutants in wastewater. Further, this invention has the capability of providing a useful condensate product. The novel process disclosed herein couples efficient evaporation with gas phase catalytic oxidation. Optionally, this process can provide for the recapture of distilled quality water that is substantially free of minerals and organics and that may, therefore, be safely returned to rivers and streams or reused in industrial processes.

DESCRIPTION OF THE RELATED ART

The problems associated with the disposal of contaminated wastewater are well known in the art. Frequently, treatment involves air stripping and the capture of the volatilized organics by a carbon bed. Certain priority pollutants are not captured, or are incompletely captured, by the carbon bed. Alternatively, contaminated wastewater streams can be disposed of using deep well technology or are subject to high temperature incineration.

The use of evaporation in pollution abatement is also known to the art. In particular vertical tube falling film evaporation with vapor recompression has been suggested to efficiently concentrate wastewater streams containing a high concentration of total dissolved solids. The use of such evaporators is described in an ASME publication entitled "Development History of the RCC Brine Concentrator For Concentrating Cooling Tower Blow Down", by J. H. Anderson, 1976.

Oxidation of organic compounds dissolved in wastewater streams is likewise well known in the art. Both liquid phase and vapor phase oxidation processes are known. For example, industrial fluids, such as dyestuff solutions, can be purified using the process disclosed in U.S. Pat. No. 4,279,693 (Kuhnlein et al.). This process involves evaporation of impurities from polluted fluids where 90% of the volatile impurities remain untreated or are subjected to flame combustion at temperatures ranging from 800°-1000° C. A small percentage of the impurities (approx. 10%) may be removed from the nonvolatiles and destroyed in a catalytic oxidation process. The catalytic oxidation process operates in a non-steam environment with a low water-to-organic ratio. U.S. Pat. No. 4,141,829 (Thiel et al.) discloses a two-step oxidation process. In the first step a contaminated water stream is subjected to a liquid oxidation process to destroy the majority of the organic substances in the liquid stream. Any volatile organics remaining after the liquid oxidation step are heated and catalytically oxidized in a gas phase reactor. U.S. Pat. No. 4,021,500 (Rogers) discloses an improved oxidative dehydration system to catalytically remove dissolved hydrocarbons. A hydrocarbon laden liquid water stream is mixed with an air/steam stream and is contacted with a solid catalyst to yield an effluent of water vapor, carbon monoxide and carbon dioxide.

U.S. Pat. No. 4,699,720 (Harada et al.) teaches a process for treating wastewater wherein a stream containing suspended solids, ammonia and chemically oxidizable substances is subjected to a liquid phase catalytic oxidation reaction. Separation of the suspended or dissolved solids occurs after the oxidation reaction by employing a reverse osmosis process. Likewise, U.S. Pat. No. 4,632,766 (Firnhaber et al.) discloses a method of treating wastewater wherein a concentrated "slime" containing water is subjected to a noncatalytic multistage oxidation in the presence of air or oxygen. Yet another wastewater treatment process using liquid phase catalytic oxidation is disclosed in U.S. Pat. No. 4,294,706 (Kakihara et al.). This reference suggests the removal of suspended solids prior to treatment (Column 3, lines 12-15).

Extraction of volatile contaminates from waste streams followed by catalytic destruction of the volatized contaminates has been practiced in the art. For example, U.S. Pat. No. 3,127,243 (Konikoff) teaches a process whereby human waste is subjected to a noncontinuous vacuum distillation process to produce vaporized materials which are passed to a high temperature catalytic reactor containing a noble metal catalyst. The reaction product is then condensed to produce potable water. Likewise, U.S. Pat. No. 3,487,016 (Zeff) teaches the oxidation of organic or inorganic materials in liquid or vapor phase using oxygen-containing gas and a catalyst containing either manganese or lead. Oxidation is performed at low temperatures and at atmospheric or less pressure. U.S. Pat. No. 3,804,756 (Callahan et al.) teaches that volatile impurities may be steam stripped from wastewaters and then chemically oxidized with a variety of catalyst formulations, with copper oxide being preferred.

The elimination of volatile organic compounds (VOC) from industrial/commercial waste gases is also well known in the art. Destruction of VOC is accomplished by catalytic incinerators. A recent article entitled, "Destruction of Volatile Organic Compounds Via Catalytic Incineration" authored by B. H. Tichenor and M. A. Palazzol, Environmental Progress, Volume 6, No. 3, August, 1987, reports the results of an investigation into various catalytic incinerator designs. Tests were performed by evaporating organic compounds into clean air streams and then passing the streams across a monolithically supported precious metal catalyst. Catalytic incineration of noxious industrial fumes is also disclosed in U.S. Pat. No. 4,330,513 (Hunter et al.). This reference discloses a process where fumes and waste gases containing hydrocarbons are contacted with a fluidized bed of nonprecious metal solid catalyst. Additionally, a series of U.S. Pat. Nos. (3,823,088; 3,992,295; 3,997,440; 4,062,772; 4,072,608 and 4,268,399) teach that waters containing minor amounts of dissolved organic materials can be purified by contacting either a liquid or gaseous phase with a promoted zinc aluminate catalyst.

Although the art has understood the need and has attempted the treatment of contaminated wastewaters and contaminated gas streams, it has failed to solve the problem of efficiently treating a wastewater stream containing both dissolved solids or nonvolatile pollutants and volatile chemically oxidizable contaminants. The present invention presents a novel continuous treatment method for concentrating dissolved solids or nonvolatile pollutants and chemically oxidizing the oxidizable contaminants. Further, this invention presents a catalytic oxidation process that can be carried out in the presence of steam at gas phase conditions.

SUMMARY OF THE INVENTION

This invention is directed toward a novel process for the treatment of wastewater streams. More specifically the invention provides a means to convert chemically oxidizable volatile pollutants in wastewater to inorganic gases. This process also has the potential to produce a useful condensate product of distilled water quality, free of minerals and organics.

It is an object of this invention to provide a process that eliminates the environmental problems commonly associated with the disposal of contaminated wastewater streams.

Another object of this invention is to provide a process that specifically is designed to treat highly mineralized wastewaters containing toxic organic and inorganic compounds which, if treated by conventional treating processes, would be too mineralized to discharge to surface freshwater receiving streams.

Yet another object of the present invention is to provide a wastewater treatment process that eliminates the need for costly incineration of contaminated aqueous streams.

Still another object of the present invention is to provide a wastewater treatment process that is environmentally safe and a cost effective substitute for deep well disposal of contaminated wastewater.

Accordingly a broad embodiment of the invention is directed to a process for treating wastewater contaminated with volatile chemically oxidizable pollutants and nonvolatile pollutants comprising, in combination, the steps of:

(a) continuously concentrating the wastewater to be treated by evaporation to produce a first stream comprising concentrated nonvolatile pollutants and a second water rich vapor phase stream substantially free of dissolved solids, the second stream comprising steam and at least 45% of all of the volatile chemically oxidizable pollutants or the total organic content (TOC), originally contained in the wastewater; and (b) contacting substantially all of the second stream with a solid oxidation catalyst in the presence of steam at gas phase oxidation conditions to convert the volatile chemically oxidizable pollutants, thereby producing a gaseous reaction product comprising steam and incondensible gases, the solid oxidation catalyst comprising an inorganic oxide support containing at least one metal oxide.

Another embodiment of the invention provides for the stabilization of concentrated nonvolatile pollutants where wastewater is treated by the steps of:

(a) continuously concentrating the wastewater to be treated by evaporation to produce a first stream comprising concentrated nonvolatile pollutants and a second water rich vapor phase stream substantially free of dissolved solids, the second stream comprising steam and at least 45% of all of the volatile chemically oxidizable pollutants originally contained in the wastewater; and (b) contacting substantially all of the second stream with a solid oxidation catalyst in the presence of steam at gas phase oxidation conditions to convert the volatile chemically oxidizable pollutants, thereby producing a gaseous reaction product comprising steam and incondensible gases, the solid oxidation catalyst comprising an inorganic oxide support containing at least one metal oxide;

(c) mixing the first stream with a stabilizing agent selected from the group consisting of cements, lime, fly ash, kiln dusts, alkali metal silicates, asphalts, pozzolans, and mixtures thereof; and (d) solidifying the resultant mixture of step (c) to form a solid mass suitable for disposal.

These as well as other embodiments of the present invention will become evident from the following, more detailed description of certain preferred embodiment.

BRIEF DESCRIPTION OF THE DRAWINGS

The accompanying drawings illustrate preferred embodiments of the invention when treating landfill leachates containing VOC pollutants. Specifically.

DETAILED DESCRIPTION OF PREFERRED EMBODIMENTS

Figure 1:
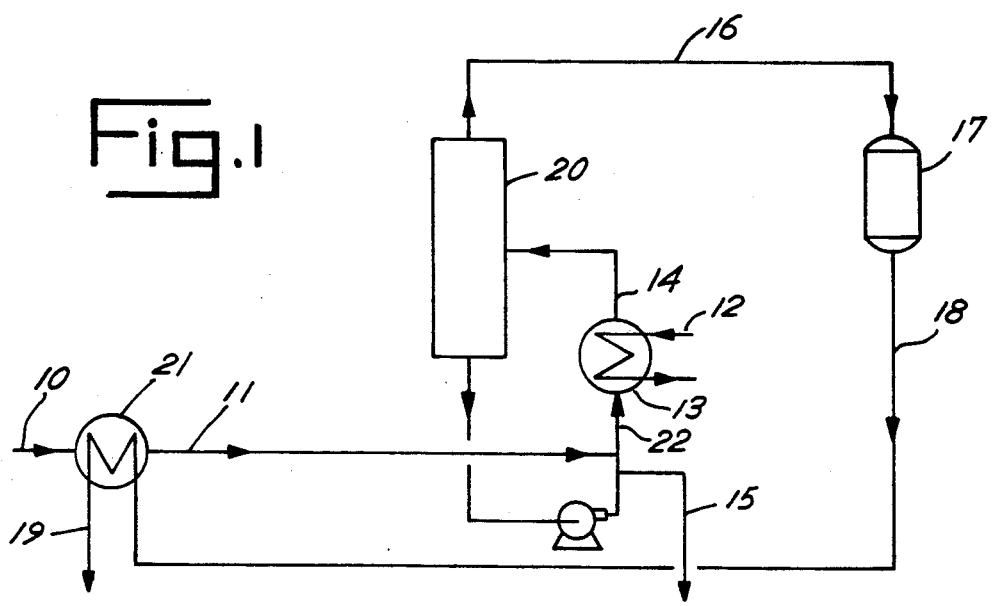
FIG. 1 is a flow diagram of an embodiment of the invention illustrating the treatment of wastewater without condensation of the oxidation reaction products.

The instant invention is capable of processing a variety of complex wastewater streams containing a wide range of pollutants. For example, the invention can process wastewaters from refinery and chemical plant operations and wastewaters emanating from mineral concentration processes, metals concentration processes, metal extraction leaching processes, and solvent stripping processes. The instant invention is especially adapted to process highly mineralized wastewaters contaminated with volatile chemically oxidizable pollutants.

Wastewater streams can be generally characterized as containing principally water that is contaminated with volatile chemically oxidizable pollutants comprising both organic and inorganic compounds. Further, wastewater typically contains nonvolatile pollutants, such as dissolved solids. The volatile chemically oxidizable pollutants include compounds, such as alcohols, ketones, esters, aromatic hydrocarbons, chlorinated hydrocarbons, ammoniacal compounds, cyanide and sulfur containing compounds, and a variety of other chemicals that are known pollutants. The dissolved solids or nonvolatile pollutants typically comprise minerals, which are broadly defined as any element, inorganic compound or mixture occurring or originating in the earth's crust and atmosphere, including all metals and non-metals, their compounds and ores. Included in the dissolved solids can be compounds of heavy metals, such as, nickel, zinc, cadmium, mercury, arsenic, and lead. Typically the wastewater stream has a dissolved solids content of at least 100 mg per liter, more typically having a dissolved solids concentration ranging from about 1,000 to about 30,000 mg per liter.

The process of the invention is particularly well suited for the treatment of leachates that emanate from landfills. The complex nature of the constituents of such wastewater streams is illustrated by the following compositional profile of a representative landfill leachate.

| Parameter | Concentration, mg/l |
| --- | --- |
| Total Dissolved Solids (TDS) | 10,000–30,000 |
| Chemical Oxygen Demand (COD) | 1,000–50,000 |
| Total Organic Carbon (TOC) | 300–15,000 |
| Iron | 5–2,000 |
| Nickel, Zinc, Cadmium, Mercury Arsenic, Lead, etc. | High |
| Chloride, Sulfate, etc. | 1000+ |
| Priority Organic Pollutants | High |

According to the invention, the wastewater stream to be treated is first subjected to an evaporation step to concentrate the dissolved solids into a first stream comprising concentrated nonvolatile pollutants, sometimes referred to as "slurry" or "brine". The unit operation of evaporation is well known in the art and details need not be included herein. Any evaporation design that can concentrate nonvolatile pollutants from a liquid stream and produce a water rich vapor phase stream substantially free of dissolved solids can be used in the invention. Examples of known evaporator designs include forced circulation, submerged tube forced circulation, Oslo-type crystallizer, short and long tube vertical, horizontal tube, and falling film. It is preferred to employ a forced circulation type evaporator when the flow rate of the feed to the evaporate is below 100 gpm. However, above 100 gpm, falling film is the more preferred. The process conditions for the evaporation step include a temperature of from about 82° C. (180° F.) to about 170° C. (338° F.) and a pressure from about subatmospheric to about 790 kPa (abs) (100 psig), with most preferred temperature and pressure ranges from about 100° C. (212° F.) to about 150° C. (302° F.) and from about atmospheric to about 446 kPa (abs) (50 psig), respectively.

One method to effect evaporation of the volatile pollutants is to subject the wastewater to direct gas fired heat. This method volatilizes the bulk of the wastewater to steam. After volatization only a nonvolatile solid or semisolid residue remains. The resultant superheated vapor stream is then sent directly to the catalytic oxidation reactor.

The stream of concentrated nonvolatile pollutants removed from the evaporator may have a pollutant concentration in the range of from about 0 to about 100 weight percent solids, preferably from about 20 to about 70 wt. %, and most preferably from about 40 to about 65 wt. %. At this concentration level the stream of concentrated pollutants is ready for final disposal using any known process, such as pond retention, crystallization or chemical stabilization, or mechanical drying. A particularly preferred method of discarding the first stream of concentrated pollutants is stabilization, including both physical and chemical stabilization. Any stabilization process known to the art may be used, however, chemical fixation and solidification processes for producing solid wastes suitable for ultimate disposal in landfills, ocean dumping etc. are most preferred. These processes involve adding stabilizing agents, for example, fly ash, asphalts, alkali metal silicates, all forms of cements, pozzolans, gypsum, calcium chloride, kiln dusts, lime, or other known stabilizing agents, to the stream of concentrated pollutants. The addition of the stabilizing agents can be performed using an inline or batch process. After mixing and curing, the mixture forms a solid. The stabilized first stream may then be disposed of following accepted disposal practices. Alternatively, the solid may be used as building materials, as landfill to support buildings, or to reclaim coastal lands, or to build levies or dikes.

Alternatively, this first stream of concentrated pollutants is heated to a temperature such that all organic materials are thermally cracked, thus producing additional volatile compounds and a particulate solid. The solid is separated from the volatiles using conventional separation processes, for example, cyclone separation or filtration. The volatile compounds are admixed with the volatilized pollutants in the water rich vapor phase stream and eventually subjected to catalytic oxidation.

When the wastewater stream contains an appreciable quantity of cyanide, it is necessary to control the level of cyanide in the first stream containing the concentrated nonvolatile pollutants. This is accomplished by maintaining the pH of the wastewater below 8.0. In some instances it may be necessary to subject the wastewater to fractional distillation, prior to the evaporation step, to prevent accumulation of excessive quantities of cyanide in the first stream.

The second stream, comprising a water rich vapor phase obtained from the evaporator, is contacted with a solid catalyst in a reaction zone maintained at oxidation reaction conditions. The chemically oxidizable volatile pollutants in the wastewater stream that were volatized in the evaporation step are oxidized to produce a gaseous reaction product comprising substantially steam and incondensible gases, primarily carbon dioxide and nitrogen. The second stream typically comprises at least 45% of all of the volatile chemically oxidizable pollutants originally contained in the wastewater. Preferably, the second stream contains at least 60% and more preferably at least 80% of the pollutants present in the wastewater. In the most preferred embodiment, substantially all of the volatile pollutants originally in the wastewater steam are contained in the water rich vapor phase. As such, substantially all of the volatile pollutants originally present in the wastewater stream are catalytically oxidized in the reaction zone.

The second stream from the evaporation step contains substantially all of the water originally contained in the wastewater fed to the process. The water in the second stream is directed to the catalytic oxidation reactor in the vapor state as steam. The term "water rich vapor phase" is defined herein as a stream that contains significantly more water/steam than volatile pollutants. Typically the steam-to-organic weight ratio is greater than 2:1. More preferably, the quantity of steam in the second stream is at least 16 times the weight of volatile pollutants contained therein. In other words, in the most preferred embodiment the volatile pollutant component of the second stream is less than 10% of the total components in the stream.

Although not completely understood and not wishing to be bound by a particular theory it is believed that the presence of steam in the oxidation reactor is beneficial to achieving complete oxidation of volatile pollutants. It is believed that the steam directly participates in the oxidation of pollutants either by reacting catalytically, thermally, or by reacting with partially oxidized compounds. This theory of direct steam participation in pollutant removal could also help explain the apparent lack of a large oxygen effect since steam is so overwhelmingly present. In fact, the oxidation of pollutants can be performed by providing less than the stoichiometric amount of oxygen. Of course, each different wastewater feed will have a different stoichiometric requirement of oxygen, but because of the high ratio of steam to volatile pollutants present in the reaction zone, high conversions of pollutants are achieved at less than the stoichiometric amount of oxygen.

Prior to the oxidation step the water rich vapor phase stream may be compressed by mechanical means or by a steam jet to increase the latent heat value of the vapor phase steam. A preferred means to compress the water rich vapor phase stream is by use of steam turbine powered compressors and pumps. These steam turbines can be operated in cogeneration mode using landfill biogas, steam from an incinerator waste heat recovery unit, or other similar source. Energy cost reductions and high cogeneration efficiencies can be realized using steam powered compressors and pumps. Likewise, the gaseous reaction product from the oxidation step may be compressed, in preference to the compression of the water rich vapor phase stream, to increase its latent heat value. In either case the latent heat can be used to provide the partial or total heat requirement needed in the evaporation step.

The catalytic oxidation is performed in a reactor at gas phase conditions using a solid catalyst. The oxidation reaction conditions include a reaction temperature in the range of from about 204° C. (400° F.) to about 1200° C. (2192° F.). Most preferably the reaction temperature should be maintained in the range from about 371° C. (700° F.) to about 677° C. (1250° F.). The gas space velocity of the water rich vapor phase stream in the reaction zone is from about 0.1 $sec^{-1}$ to about 1000 $sec^{-1}$, most preferably from about 5 $sec^{-1}$ to about 100 $sec^{-1}$. The reaction zone pressure preferably is in the operating range of from subatmospheric to about 790 kPa (abs) (100 psig), with a most preferred operating pressure of from about atmospheric to about 446 kPa (abs) (50 psig). The chemically oxidizable compounds in the water rich vapor phase stream are catalytically oxidized in the presence of the steam that was generated during the evaporation step.

The solid catalyst used in the oxidation zone may be selected from any of the known commercially existing oxidation catalyst compositions, or mixtures of known oxidation catalysts, that meet the required standards for stability and activity and that possess a high selectivity for oxidation of volatile organic and inorganic compounds. The active component of the oxidation catalysts is a metal, preferably a nonprecious metal, supported on a solid carrier. The preferred solid carrier is alumina, however, any known carriers may be used, for example, silica, silica-alumina, clay or like materials. The carrier may be in the form of spheres, pellets or extrudates. The amount of active metal on the catalyst is preferably from about 5 to about 50 weight percent, based on the total catalyst weight. More preferably the metal component comprises from about 15 to about 25 weight percent of the catalyst. A preferred oxidation catalyst composition includes chromic oxide and alumina in the form of an extrudate. This preferred catalyst and its method of preparation are more thoroughly described in U.S. Pat. No. 4,330,513 (Hunter et al), which is incorporated herein by reference.

The oxidation reaction of this invention is exothermic and can cause reaction temperatures to increase to excessive levels. To prevent temperatures from exceeding approximately 1200° C. (2192° F.), a quench stream may be added to the oxidation reaction zone. A preferred quench medium is the condensate product obtained from the evaporator. Depending upon the chemical oxygen content of the water rich vapor phase stream and the level of chemically oxidizable compounds to be reacted, it may be necessary to supply additional chemical oxygen as a reactant to achieve the high level of conversion required in the oxidation reaction. Additional chemical oxygen can be supplied by any known means, with the injection of air, oxygen enriched air, or $O_2$ being preferred. On initial start-up of the oxidation reactor it may be necessary to use an external heat source to increase the temperature of the reactants to a point where the oxidation reaction will begin. This external heat source can be supplied from either direct or indirect sources. Indirect sources include electrical heating and conventional heat exchange equipment. Direct heating includes direct gas fired heating of the water rich vapor phase stream. To maintain the appropriate inlet reactor temperature of the reactants during the process it may be necessary or desirable to perform indirect heat exchange of the reactants with a portion of the reaction products. Alternatively, the reactants may be heated by direct fired heat prior to introduction into the oxidation reactor. Any direct fired heating process known to the art may be used.

The oxidation reaction step of the invention is capable of catalytically oxidizing a wide range of volatile organic and inorganic compounds, including halogenated organics, organophosphorus compounds, organosulfur compounds and organonitrogen compounds. The gaseous reaction product obtained from the oxidation of such compounds may be highly acidic, containing HCl, $PO_x$, $SO_x$ and $NO_x$. The acidic nature of the product can have deleterious effects on downstream equipment metallurgy. Neutralization of the acidic gaseous reaction products can prevent corrosion and the eventual destruction of downstream equipment. Any neutralization process known to the art may be used to neutralize the acidic reaction products, including solid scrubbers, liquid scrubbers, or a combination of both. A preferred neutralization method involves the use of a limestone bed located downstream of the oxidation reactor. The inherent alkalinity of limestone will neutralize and remove strongly acidic gases contained in the gaseous reaction stream. Depending upon the amount of acidic gas present, multiple limestone beds arranged in series flow may be employed. A preferred type of limestone is dolomitic limestone, which contains a carbonate of calcium and magnesium. The magnesium is better suited to capture volatized borates and arsenates.

In addition to the neutralization of acidic gases in the gaseous reaction product, the limestone bed may also be utilized as a temperature control means when the gaseous reaction product is used to supply the heat of evaporation in the evaporation step. Temperature control may be desirable to prevent thermal stress of the evaporator. Thermal stress occurs because the gaseous reaction product from the highly exothermic catalytic oxidation reaction can, in some instances, be several hundred degrees higher in temperature than the normal operating temperature of the evaporator. Normally it is preferred that the medium used to supply the heat of evaporation be only 5° to 17° C. (9° to 30° F.) higher than the boiling point of the wastewater to be evaporated. An alternative means to prevent thermal stress is to quench the gaseous reaction products, preferably using a portion of the condensate product stream.

Although oxidation of the chemically oxidizable compounds in the water rich vapor phase stream is preferably performed using a solid supported metal catalyst, it is within the scope of the invention to perform the oxidation step by any catalytic means or combination of means known to the art. For example, the oxidation reaction may be performed by ultraviolet light catalyzed peroxide or ozone oxidation.

The composition of the gaseous reaction product exiting from the oxidation reactor comprises substantially steam and incondensible gases, primarily carbon dioxide and $N_2$. The gaseous reaction product can optionally be condensed to produce a useful condensate of substantially liquid water. Condensation can be performed by any method known to the art. One method is to pass the gaseous reaction product through an economizer to utilize its latent heat to effect the evaporation of feed wastewater. Alternatively, the condensation of the gaseous reaction product can be performed in an evaporator while simultaneously utilizing its latent heat to effect the evaporation of the wastewater. As the hot gaseous oxidation reaction product releases its heat to evaporate the wastewater, condensation occurs and the condensate produced is drawn off as a liquid water product stream. A condensate product stream produced by the process of the invention is comprised of substantially liquid water that is free of minerals and organics and is reusable as a condensate for other processes or the condensate may be directly disposed of to existing surface water receiving streams without the need for additional treatment.

A more complete understanding of the inventive concept of this invention may be obtained by a review of the accompanying figures, which present three preferred embodiments of the invention. The presentation of these embodiments is not intended to exclude from the scope of the inventive concept those other embodiments set out herein or other reasonable and normal modifications of the inventive concept. Details, such as miscellaneous pumps, heaters, and coolers, condensers, start-up lines, valving, and similar hardware, have been omitted as being nonessential to a clear understanding of the preferred embodiments of the invention.

FIG. 1 is a flow diagram of the invention illustrating the treatment of wastewater without condensation of the oxidation reaction products. Wastewater to be treated is carried by line 10 to heat exchanger means 21 where the wastewater is heated indirectly with hot gaseous oxidation reaction product in line 18. The heated wastewater is carried by line 11 to evaporator feed line 22, where it is mixed with a concentrated slurry of nonvolatile pollutants removed and recirculated from the bottom of evaporator 20.

The admixture of heated wastewater and concentrated slurry in line 22 is carried to a second heat exchanger means 13, wherein the admixture is heated indirectly with the contents of line 12 and carried by line 14 into evaporator means 20 wherein volatile chemically oxidizable pollutants and steam are vaporized and removed overhead via line 16. The vaporized pollutants and steam are contacted with a solid nonprecious metal oxidation catalyst in reactor 17. In some instances it may be necessary to increase the temperature of the material in line 16 prior to contacting with the oxidation catalyst. Additionally, it may be necessary, depending on the chemical oxygen content of the material in line 16, to supply additional oxygen from an external source to achieve complete oxidation of the volatile pollutants.

The gaseous reaction products formed in reactor 17 are removed via line 18, indirectly heat exchanged in heat exchanger means 21 with the wastewater feed in line 10, and then removed from the process via line 19. Removal of the nonvolatile pollutants is effected by taking a slip stream 15 from the concentrated slurried pollutants that were removed from the bottom of evaporator means 20.

Figure 2:
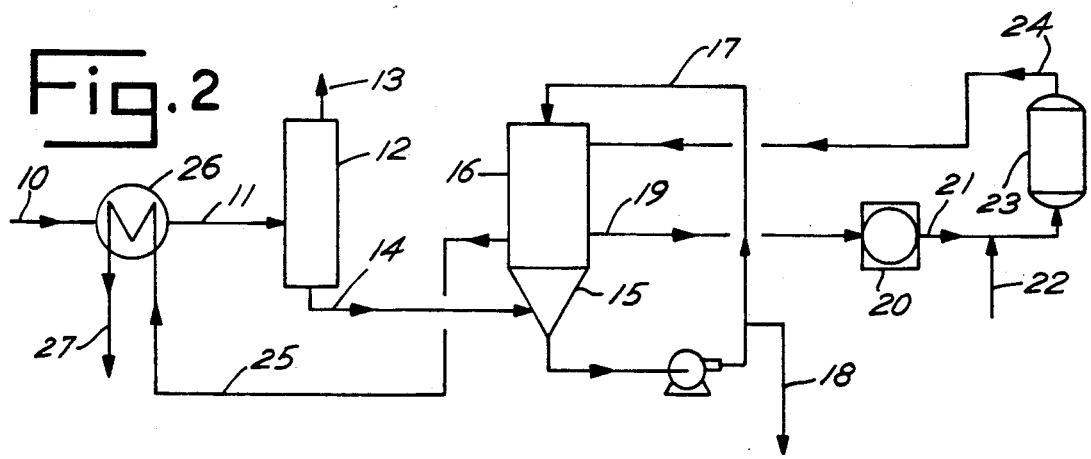
FIG. 2 is a flow diagram of an embodiment of the invention adapted for condensation of oxidation reaction products.

Referring now to the embodiment illustrated in FIG. 2, the wastewater to be treated is carried by line 10 to heat exchanger means 26 where it is heated indirectly with the condensate product stream 25. The heated wastewater is carried by line 11 and passed into deaeration vessel 12 where incondensible gases, such as, oxygen, nitrogen, carbon dioxide and possibly ammonia are removed via vent line 13. The deaerated wastewater is carried by line 14 to sump 15 of evaporator 16. A concentrate or slurry of nonvolatile dissolved and slurred pollutants, both inorganic or organic, is contained in sump 15. This slurry is continuously circulated through line 17 to the top of evaporator 16 where the water and volatile chemically oxidizable pollutants are vaporized. The water rich vapor generated in the evaporator is substantially free of all dissolved solids and is removed from the evaporator by line 19. The water rich vapor phase stream in line 19 is compressed by compression means 20 and returned to line 21.

The compressed water rich vapor phase stream in line 21 is then combined with an oxygen containing stream 22 prior to entering oxidation reactor 23. The degree of conversion of volatile pollutants in the oxidation reactor depends on 1) the degree of contamination of the feed wastewater and 2) the tolerable level of pollutants in the stream exiting the process. The higher the level of pollutants in the incoming wastewater the greater degree of conversion will be achieved in the oxidation reactor. Similarly, if the level of contaminants allowable in the stream exiting the process is high, then a lower degree of conversion is required in the oxidation reactor. The goal to be accomplished by the oxidation reactor is not the percentage removal of pollutants, but rather is the removal of a sufficient quantity of pollutants such that the discharge stream from the process is not harmful to human health or the environment. Depending on the make-up of the wastewater the oxidation reactor can achieve at least 95% conversion, and in some instances 99+% conversion, of the chemically oxidizable compounds in the water rich vapor phase stream. This produces a gaseous reaction product of substantially steam and incondensible gases, primarily carbon dioxide. The gaseous reaction product is removed from the oxidation reactor by line 24. A portion of the gaseous reaction product in line 24 can be used as a preheat means for maintaining the temperature of the reactants entering the oxidation reactor.

Condensation of the gaseous reaction product is accomplished upon introduction of the gaseous reaction product in line 24 to evaporator 16. The condensate formed in the evaporator is continuously removed through line 25, heat exchanged with incoming wastewater and removed from the process via line 27.

Figure 3:
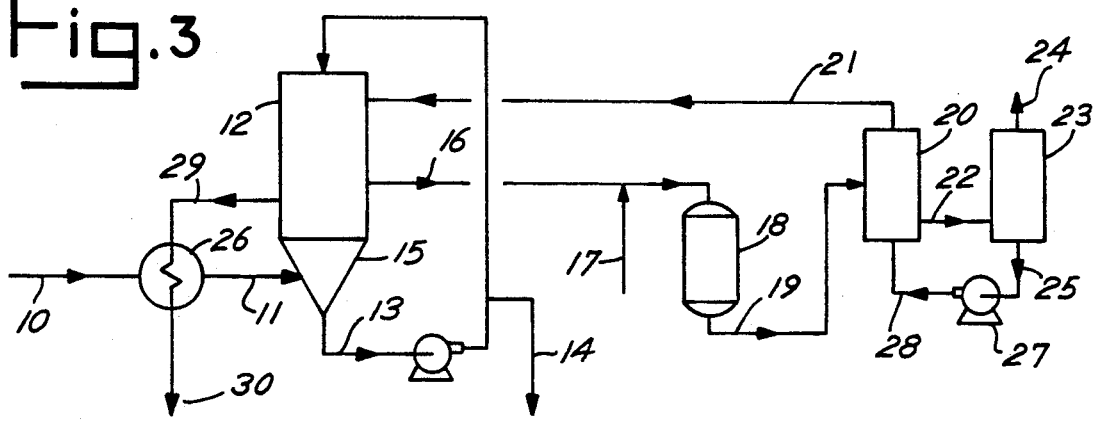
FIG. 3 is a flow diagram of an embodiment of the invention adapted for the treatment of a wastewater containing a high level of VOC pollutants and a high concentration of incondensible gases.

FIG. 3 illustrates yet another embodiment of the invention adapted for processing wastewater containing a high concentration of chemically oxidizable compounds, as well as a significant fraction of incondensible gases. When the fraction of incondensible gases entering the process contains thirty percent or more incondensible components, the heat transfer may be intolerably impaired. Likewise, high levels of chemically oxidizable compounds cause a problem by appearing in the deaerator vent. In FIG. 3, polluted wastewater is fed to the process via line 10 and is heat exchanged in heat exchanger means 26 with product condensate in line 29 to increase the temperature of the wastewater to near its boiling point. The heated wastewater is carried by line 11 to evaporator sump 15 where the nonvolatile pollutants in the wastewater are concentrated. The concentrated wastewater is continuously circulated to the top of evaporator 12. Slip stream 14 is used to continuously withdraw nonvolatile pollutants from the process for eventual disposal.

The water rich vapor phase stream containing steam and chemically oxidizable compounds vaporized in evaporator 12 are drawn off through line 16, mixed with an oxygen containing gas stream 17 and catalytically oxidized in oxidation reactor 18. Gaseous reaction products of substantially steam and incondensible gases, such as carbon dioxide, are removed from the oxidation reactor by line 19 and passed to steam boiler 20. A portion of the gaseous reaction product may be used to indirectly heat exchange the reactants being fed to the oxidation reactor. The gaseous reaction product is condensed in the steam boiler and sent through line 22 to deaerator 23 where incondensible gases such as nitrogen, oxygen, carbon monoxide, and carbon dioxide are vented through line 24. The deaerated condensed reaction products are withdrawn through line 25 and circulated via pump 27 through line 28 back to steam boiler 20. A portion of the deaerated condensed reaction product in line 28 may be used as a quench in the oxidation reactor to maintain the exothermic reaction temperature in the preferred range.

Steam from the steam boiler is removed overhead through line 21 and sent to the shell side of evaporator 12 wherein it is condensed and its latent heat is used to evaporate the concentrated wastewater on the tube side of the evaporator. Optionally, a steam compressor may be employed to compress the steam in line 21 to increase its heat value. However, pump 27 can be designed to provide a sufficient system pressure to maximize the heat value of the steam obtained from the steam boiler. The product condensate is removed from the evaporator through line 29, heat exchanged with the wastewater feed and then removed from the process through line 30. The product condensate in line 30 is of distilled water quality containing substantially no minerals and no dissolved organics.

Figure 4:
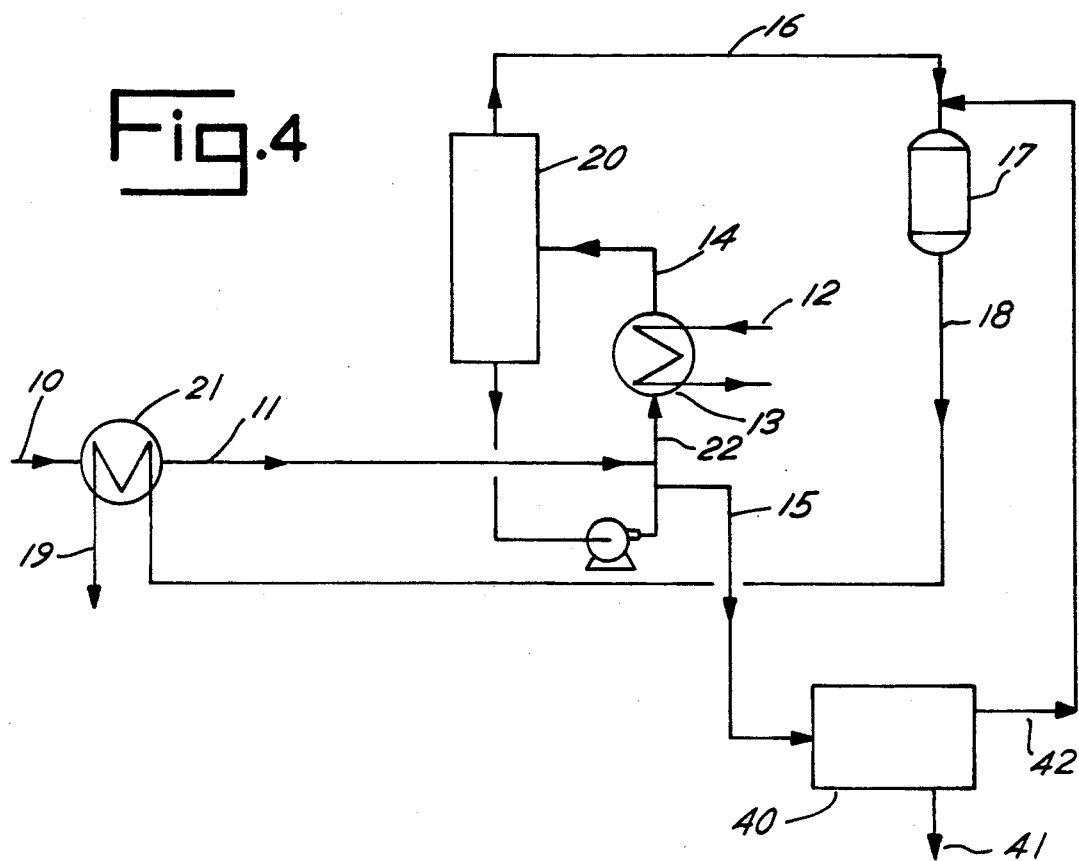
FIG. 4 is a flow diagram of an embodiment of the invention adapted to volatize the concentrated pollutants after evaporation of the wastewater using direct fired heating.

Another embodiment is illustrated in FIG. 4. This embodiment is substantially similar to the embodiment of FIG. 1 except that the first stream of concentrated pollutants is subjected to direct fired heating. The concentrated pollutants removed from evaporator 20 by line 15 are directed to heating unit 40 where all organic materials contained therein are thermally cracked, producing additional volatile compounds and a particulate solid. The particulate solid is removed from the process via line 41 for disposal using any known process. The additional volatile compounds are introduced into line 16 via line 42.

Figure 5:
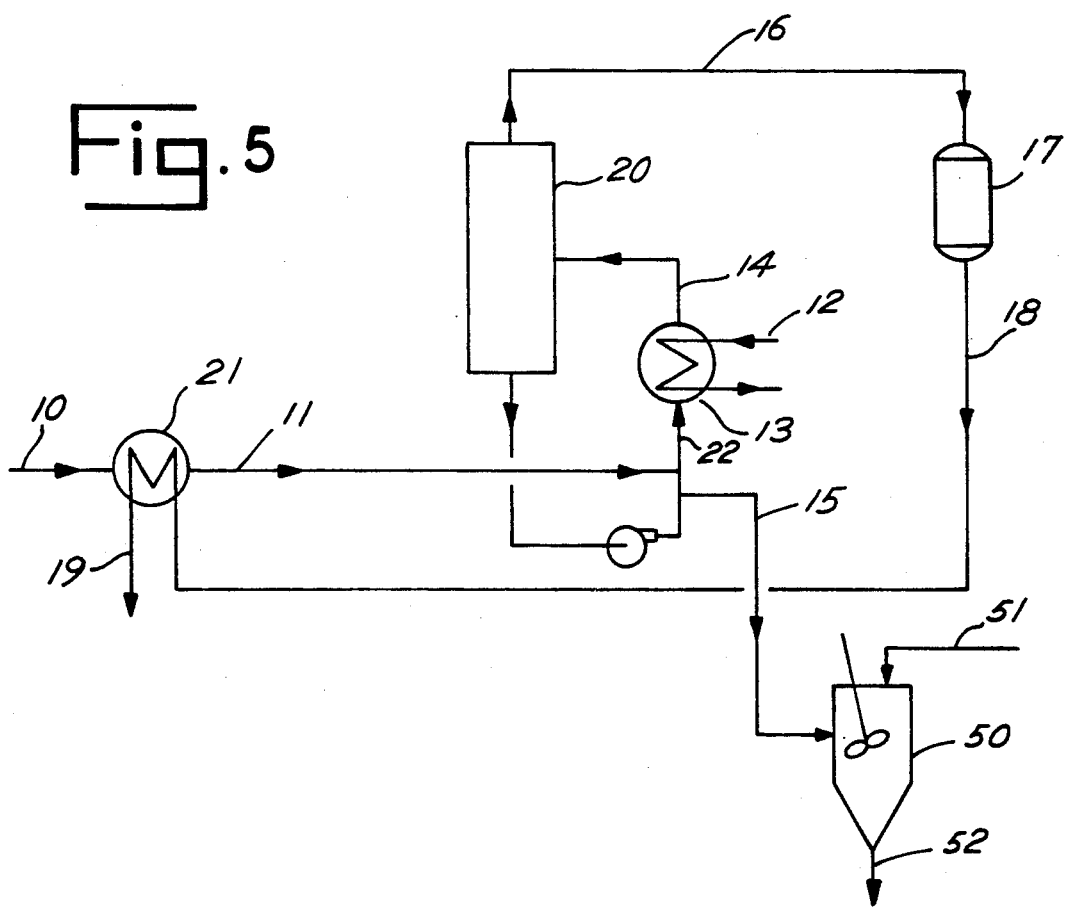
FIG. 5 is a flow diagram of an embodiment of the invention adapted to stabilize the concentrated pollutants to form a solid mass suitable for disposal.

Yet another embodiment is illustrated in FIG. 5. This embodiment is substantially similar to the embodiment of FIG. 1 except that the first stream is stabilized to produce a solid mass suitable for disposal. In FIG. 5 the concentrated pollutants in line 15 are introduced to mixer 50 and admixed with a stabilizing agent added via line 51. The resultant mixture is removed via line 52, cured, and allowed to form a solid which is suitable for disposal.

In order to more fully demonstrate the attendant advantages arising from the present invention the following examples are set forth. It is to be understood that the following are by way of example only and are not intended as an undue limitation on the otherwise broad scope of the invention.

EXAMPLE 1

To demonstrate the effectiveness of catalytic oxidation of volatile chemically oxidizable pollutants laboratory test runs were performed in accordance with the oxidation process of the invention. A laboratory continuous oxidation unit was used employing toluene as a surrogate volatile pollutant. The catalyst used comprised chromic oxide on an alumina support. Steam, oxygen and toluene were fed at a pressure of about 25 psig to a single-pass reactor containing the catalyst. The gaseous reaction products were condensed and sampled by gas chromatograph.

The toluene feed rate was set to achieve 500 ppm in steam on a volume basis and the oxygen was added to achieve 2% by volume of steam. The catalyst volume was varied to examine the effect of varying the gas space velocity. Table 1 contains a summary of test data results.

Test run results in Table 1 clearly show that the oxidation of toluene (i.e., removal efficiency) was greater than 95% in all cases. Further, the gas space velocity, in the range tested, did not significantly affect the removal efficiency.

TABLE 1

| | Runs Using Toluene as Surrogate Pollutant | | | | |
|---|---|---|---|---|---|
| Runs | Preheat Temp. Celsius | Reactor Temp. Celsius | Space Velocity per sec. | Toluene out (ppm) | Removal Efficiency (%) |
| 1 | 317 | 362 | 9.2 | 18.82 | 96.24 |
| 2 | 318 | 369 | 9.3 | 10.97 | 97.81 |
| 6 | 373 | 419 | 10.0 | 7.20 | 98.56 |
| 7 | 373 | 424 | 10.1 | 5.10 | 98.98 |
| 3 | 432 | 482 | 11.0 | 1.58 | 99.68 |
| 4 | 432 | 487 | 11.0 | 1.17 | 99.77 |
| 12 | 427 | 479 | 7.3 | 1.52 | 99.70 |
| 13 | 427 | 479 | 7.3 | 1.61 | 99.68 |
| 10 | 510 | 563 | 12.1 | 0.73 | 99.85 |
| 11 | 510 | 566 | 12.2 | 0.93 | 99.81 |
| 15 | 510 | 702 | 9.4 | <0.05 | >99.99 |
| 14 | 513 | 702 | 9.4 | <0.05 | >99.99 |

EXAMPLE 2

Test runs were performed to evaluate the effect of oxygen concentration on the oxidation process of this invention. The experimental conditions and apparatus used in Example 1 were followed for the test runs of this example with the exception that the oxygen concentration of the stream fed to the reactor was varied. Runs 3 and 4 had O₂ concentrations of 2% by volume of steam. Run 5 had 4% by volume and Runs 8 and 9 had 10% by volume. The experimental results presented in Table 2 shows complete oxidation of toluene for all O₂ concentration levels tested.

TABLE 2

Runs Using Toluene as Surrogate Pollutant

| Runs | Preheat Temp. Celsius | Reactor Temp. Celsius | Space Velocity per sec. | Toluene out (ppm) | Removal Efficiency (%) |
|---|---|---|---|---|---|
| 3 | 432 | 482 | 11.0 | 1.58 | 99.68 |
| 4 | 432 | 487 | 11.0 | 1.17 | 99.77 |
| 5 | 431 | 483 | 11.2 | 1.68 | 99.66 |
| 8 | 427 | 478 | 10.7 | 0.96 | 99.81 |
| 9 | 429 | 481 | 10.7 | 1.10 | 99.78 |

EXAMPLE 3

Oxidation of a chlorinated hydrocarbon in accordance with the invention was performed using the experimental procedure of Example 1. The chlorinated hydrocarbon used in Runs 16 and 17 was tetrachloroethylene (TCE). The experimental results in Table 3 show that TCE was removed at a high efficiency.

TABLE 3

Runs Using TCE as Surrogate Pollutant

| Runs | Preheat Temp. Celsius | Reactor Temp. Celsius | Space Velocity per sec. | TCE out (ppm) | Removal Efficiency (%) |
|---|---|---|---|---|---|
| 16 | 509 | 677 | 9.2 | 1.12 | 99.78 |
| 17 | 513 | 679 | 9.2 | 0.67 | 99.87 |

EXAMPLE 4

Oxidation of volatile inorganic compounds in accordance with the invention was performed using the experimental procedure of Example 1. The volatile inorganic compound used in Runs 18 and 19 was ammonia, fed to the oxidation reactor as a 28% ammonium hydroxide solution. The experimental results in Table 4 show that ammonia was removed at high efficiency.

TABLE 4

Runs Using Ammonia as Surrogate Pollutant

| Runs | Preheat Temp. Celsius | Reactor Temp. Celsius | Space Velocity per sec. | Ammonia out (ppm) | Removal Efficiency (%) |
|---|---|---|---|---|---|
| 18 | 513 | 677 | 9.2 | 0.12 | 99.98 |
| 19 | 513 | 678 | 9.2 | 0.04 | 99.99 |

EXAMPLE 5

Oxidation of a mixture of pollutants was performed in accordance with the invention to demonstrate that compounds that are known to be more difficult to oxidize are readily oxidizable in the presence of compounds easily oxidized. The experimental procedure of Examples 3 was repeated except that 250 and 288 ppm of propane were additionally added to the 500 ppm of TCE to give 750 ppm and 788 ppm total volatile pollutants in Runs 20 and 21, respectively. Ammonia was added in an amount of 750 and 799 ppm to the 500 ppm of TCE to give 1250 and 1299 ppm total pollutants in Runs 22 and 23, respectively. The experimental results are presented in Table 5. The results clearly show that removal efficiency of a more difficult to oxidize compounds, i.e., TCE, is not reduced by the presence of propane or ammonia, which are readily oxidized.

TABLE 5

Runs Using TCE Mixed Surrogates

| Runs | Preheat Temp. Celsius | Reactor Temp. Celsius | Space Velocity per sec. | TCE out (ppm) | Removal Efficiency (%) |
|---|---|---|---|---|---|
| 20 | 510 | 677 | 9.2 | 0.32 | 99.94 |
| 21 | 510 | 677 | 9.2 | 0.46 | 99.91 |
| 22 | 510 | 672 | 9.1 | <0.02 | >99.996 |
| 23 | 510 | 671 | 9.1 | <0.02 | >99.996 |

EXAMPLE 6

In accordance with the process of the invention, a 19-day continuous run was made on an experimental pilot scale unit having an evaporator section and an oxidation section. In the evaporator section, a wastewater feed tank was connected by piping and a pump to a steam heated shell and tube heat exchanger. A recirculation pump forced the feed through the heat exchanger into a vapor body where evaporation of hot volatiles occurred, and back again to the heat exchanger, thus forcing liquid recycle. As the concentration of nonvolatiles increased in the recycle liquid, small portions of the liquid were removed from time to time through a heated withdrawal pipe and valve to keep the concentration of nonvolatiles constant at a predetermined level. The vapors from the vapor body passed through piping to the oxidation section. In the oxidation section, oxygen was added to the vapor stream to give a 2% concentration and the mixed gases passed through an electrically heated preheater and then through a vertical bed of catalyst in an oxidation reactor. The hot reacted gases were then passed through a water-cooled heat exchanger to condense the water and other condensibles. The condensed product was collected in a product tank. Flow meters, pressure gauges, thermocouples, and sampling points around the system allowed the performance of the system to be monitored.

An actual wastewater consisting of a mixture of leachate from a hazardous waste landfill and wastewaters separated from other hazardous wastes was used in this test. Because the run spanned a considerable time period and the treated wastewater was taken from a wastewater storage tank on a daily basis, the feed varied somewhat from day to day during the run. A representative analysis is given in Table 6. In appearance, the wastewater was a pale yellow clear liquid having a disagreeable odor.

During the run, the wastewater feed rate averaged 15.4 gallons per hour. The crystal clear odorless condensate averaged 15.0 gallons per hour. The nonvolatiles were withdrawn at an average rate of 0.4 gallon per hour. This stream was a dark brown, very smelly slurry averaging 30% suspended solids and 50% total solids. The system pressure was essentially atmospheric, pressure being only that due to pressure drop across the system (1 to 3 psig, 108 to 122 kPa abs.). The oxidation temperature ranged from about 880° F. to about 1240° F. (about 470° C. to about 670° C.) while the gas space velocity varied from about 23 sec$^{-1}$ to about 30 sec$^{-1}$. The feed total organic carbon (TOC) values obtained regularly during the run ranged from 1200 to 1500 ppm and the product TOC values obtained on samples taken periodically during the run ranged from 15 to 128 ppm. At the end of the run period, the unit was lined out with the oxidation temperature at about 1080° F. (about 580° C.) and at a space velocity of about 27 sec$^{-1}$. A sample of the condensate taken from the product tank at the end of the run had the product analysis shown in Table 6. There was no evidence of catalyst deactivation during the run.

A priority pollutant scan involves analysis for 112 specific organic compounds and 12 specific heavy metal ions. Shown in Table 6 are only those priority pollutants that were actually found although all were analyzed for. Different laboratories were used for the two analyses shown; the laboratory which analyzed the product had lower detection limits. Where a value in Table 6 is reported using the symbol "<", this denotes the detection limit for that specific substance at that laboratory, and the "<" sign indicates that the substance was not detected. Where a substance was detected, the value obtained is listed in Table 6.

As can be seen from the data in Table 6, the process of the instant invention removed trace volatile organic compounds and nonvolatiles to extremely low levels and produced clean water from a very polluted wastewater containing a significant amount of nonvolatile impurities as well as volatile impurities.

TABLE 6

| Continuous Pilot Scale Run | | |
|---|---|---|
| | Feed Analysis | Product Analysis |
| pH | 3 | 2.2 |
| Total Suspended Solids, ppm | <40 | 1.8 |
| Total Dissolved Solids, ppm | 15100 | <40 |
| BOD, mg/l oxygen | | <1.0 |
| COD, mg/l oxygen | | 18.9 |
| TOC, ppm | 1350 | 15.2 |
| Priority Organic Pollutants, ppm | | |
| Methylene chloride | 104 | <0.01 |
| 1,1,1-Trichloroethane | 0.08 | 0.02 |
| Benzene | 0.08 | <0.01 |
| Toluene | 0.14 | <0.01 |
| Acetone | 20.8 | <0.01 |
| Tetrachloroethylene | 0.32 | <0.01 |
| 4-Methyl-2-pentanone | 1.7 | <0.01 |
| 2-butanone | 12.6 | <0.01 |
| 1,2-Dichloroethane | 0.35 | <0.01 |
| 1,1,2-Trichlorethane | <0.07 | 0.03 |
| Priority Heavy Metals, ppm | | |
| Arsenic | 7.9 | <0.05 |
| Beryllium | 0.22 | <0.02 |
| Cadmium | 0.28 | <0.02 |
| Chromium | 3.5 | 1.6 |
| Nickel | 112 | 1.8 |
| Zinc | 29 | 0.04 |

The present invention has been described in terms of certain preferred embodiments. Of course, numerous other embodiments not specifically described may fall within the spirit or scope of the following claims.

We claim as our invention:

1. A process for continuously treating an aqueous waste stream contaminated with volatile chemically oxidizable pollutants and nonvolatile pollutants comprising, in combination, the steps of:
   (a) continuously concentrating the nonvolatile pollutants in the aqueous waste stream to be treated by a continuous evaporation process that simultaneously produces concentrated nonvolatile pollutants originally present in the waste stream and a water rich vapor phase stream substantially free of minerals, dissolved solids and metals, the waste stream to be treated including inorganic nonvolatile pollutants comprising minerals, metals selected from the group consisting of nickel, lead, arsenic, cadmium, mercury, and zinc, and inorganic compounds containing either sulfate compounds or chloride compounds, the water rich vapor stream comprising steam and at least 45% of the volatile chemically oxidizable pollutants originally contained in the waste stream;
   (b) operating the continuous evaporation process at conditions sufficient to achieve a solids content of the concentrated nonvolatile pollutants of from about 20 to about 70 wt. %;
   (c) removing a stream from the continuous evaporation process comprising a portion of the concentrated nonvolatile pollutants of step (b), the removal occurring while the continuous evaporation process is ongoing;
   (d) removing from the continuous evaporation process a portion of the concentrated nonvolatile pollutants of step (b) in order to maintain the solids content in the concentrated nonvolatile pollutants at about 20 to about 70 wt. %;
   (e) recycling the stream removed in step (c) back to the continuous evaporation process; and
   (f) contacting substantially all of the water rich vapor stream with a solid oxidation catalyst in the presence of steam at gas phase oxidation conditions to convert the volatile chemically oxidizable pollutants, thereby producing a gaseous reaction product comprising steam and incondensible gases, the solid oxidation catalyst comprising an inorganic oxide support containing at least one metal oxide.

2. The process of claim 1 wherein the quantity of steam in the water rich vapor phase stream is at least 2 times the weight of the volatile pollutants.

3. The process of claim 1 wherein the evaporation is conducted at a temperature from about 100° C. to about 150° C. and a pressure from about atmospheric to about 446 kPa (abs).

4. The process of claim 1 wherein the water rich vapor phase stream is admixed with an oxygen containing stream.

5. The process of claim 1 wherein the water rich vapor phase stream is heated by direct fired heating prior to contact with the catalyst.

6. The process of claim 1 wherein the oxidation conditions comprise a reaction temperature from about 371° C. to about 677° C, a gas space velocity from about 5 to about 100 sec$^{-1}$ and a pressure of from about atmospheric to about 446 kPa (abs).

7. The process of claim 1 wherein the at least one metal oxide is formed from a nonprecious metal.

8. The process of claim 7 wherein the at least one metal oxide comprises chromium and the inorganic oxide support comprises alumina.

9. The process of claim 1 wherein energy required for evaporation of the waste stream is supplied by condensing the gaseous reaction product.

10. The process of claim 1 wherein the water rich vapor phase stream is compressed to increase its heat value.

11. The process of claim 1 wherein the gaseous reaction product is compressed to increase its heat value.

12. A process for continuously treating an aqueous waste stream contaminated with volatile chemically oxidizable pollutants and nonvolatile pollutants comprising, in combination, the steps of:

(a) continuously concentrating the nonvolatile pollutants in the aqueous waste stream to be treated by a continuous evaporation process that simultaneously produces concentrated nonvolatile pollutants originally present in the waste stream and a water rich vapor phase stream substantially free of dissolved solids, the waste stream to be treated comprising inorganic nonvolatile pollutants, the water rich vapor phase stream comprising steam and at least 45% of the volatile chemically oxidizable pollutants originally contained in the waste stream;

(b) operating the continuous evaporation process at conditions sufficient to achieve a solids content of the concentrated nonvolatile pollutants of from about 20 to about 70 wt. %;

(c) removing from the continuous evaporation process a portion of the concentrated nonvolatile pollutants of step (b) in order to maintain the solids content of concentrated nonvolatile pollutants at about 20 to about 70 wt. %;

(d) contacting substantially all of the water rich vapor phase stream with a solid oxidation catalyst in the presence of steam at gas phase oxidation conditions to convert the volatile chemically oxidizable pollutants, thereby producing a gaseous reaction product comprising steam and incondensible gases, the solid oxidation catalyst comprising an inorganic oxide support containing at least one metal oxide;

(e) mixing a part of the portion of concentrated nonvolatile pollutants removed from the continuous evaporation process in step (c) with a stabilizing agent selected from the group consisting of cements, lime, fly ash, kiln dusts, alkali metal silicates, asphalts, pozzolans, and mixtures thereof;

(f) recycling a second part of the portion of concentrated nonvolatile pollutants removed in step (c) back to the continuous evaporation process; and (g) solidifying the resultant mixture of step (e) to form a solid.

13. A process for treating wastewater contaminated with volatile chemically oxidizable pollutants and nonvolatile pollutants comprising, in combination, the steps of:

(a) continuously concentrating the wastewater to be treated by evaporation to produce a first stream comprising concentrated nonvolatile pollutants and a second water rich vapor phase stream substantially free of dissolved solids, the second stream comprising steam and at least 45% of the volatile chemically oxidizable pollutants originally contained in the wastewater;

(b) contacting substantially all of the second stream with a solid oxidation catalyst in the presence of steam at gas phase oxidation conditions to convert the volatile chemically oxidizable pollutants, thereby producing a gaseous reaction product comprising steam and incondensible gases, the solid oxidation catalyst comprising an inorganic oxide support containing at least one metal oxide;

(c) recycling a first portion of the first stream back to the evaporation process of step (a) in order to maintain the solids content of concentrated nonvolatile pollutants at about 20 to about 70 wt. %;

(d) heating a second portion of the first stream by direct fired heating to vaporize pollutants not volatilized by the evaporation of step (a); and (e) mixing the vaporized pollutants with the second stream prior to contact with the catalyst.

* * * * *